United States Patent
Foster et al.

(10) Patent No.: US 9,520,831 B1
(45) Date of Patent: Dec. 13, 2016

(54) METHOD AND APPARATUS FOR SYNTHESIZING SIGNALS WITH PHASE CONTINUOUS AND PHASE COHERENT TRANSITIONS

(71) Applicant: KEYSIGHT TECHNOLOGIES, INC., Minneapolis, MN (US)

(72) Inventors: Michael S. Foster, Santa Rosa, CA (US); Stephen T. Sparks, Santa Rosa, CA (US)

(73) Assignee: Keysight Technologies, Inc., Santa Rosa, CA (US)

( * ) Notice: Subject to any disclaimer, the term of this patent is extended or adjusted under 35 U.S.C. 154(b) by 127 days.

(21) Appl. No.: 14/316,318

(22) Filed: Jun. 26, 2014

(51) Int. Cl.
H03B 21/02 (2006.01)
(52) U.S. Cl.
CPC .................... *H03B 21/02* (2013.01)
(58) Field of Classification Search
USPC ................. 327/107, 105; 708/271
See application file for complete search history.

(56) References Cited

U.S. PATENT DOCUMENTS

| | | | | |
|---|---|---|---|---|
| 4,628,286 A * | 12/1986 | Nossen | ............... | 332/100 |
| 4,752,902 A * | 6/1988 | Goldberg | ............... | 708/276 |
| 4,806,881 A * | 2/1989 | Ives et al. | ............... | 332/108 |
| 5,084,681 A * | 1/1992 | Kovalick et al. | ............... | 327/106 |
| 5,329,260 A * | 7/1994 | Poplin | ............... | 332/119 |
| 5,371,765 A * | 12/1994 | Guilford | ............... | 375/373 |
| 5,519,343 A * | 5/1996 | Britz | ............... | 327/106 |
| 5,726,609 A * | 3/1998 | Lindholm | ............... | 332/115 |
| 5,898,325 A * | 4/1999 | Crook et al. | ............... | 327/105 |
| 6,066,967 A * | 5/2000 | Cahill et al. | ............... | 327/107 |
| 7,034,624 B1 * | 4/2006 | Gentile | ............... | 331/34 |
| 7,606,849 B2 * | 10/2009 | Kushnick | ............... | 708/271 |
| 7,688,912 B2 * | 3/2010 | Albulet | ............... | 375/285 |
| 7,760,031 B2 * | 7/2010 | Whittet et al. | ............... | 331/56 |
| 2005/0003785 A1 * | 1/2005 | Jackson et al. | ............... | 455/260 |

* cited by examiner

*Primary Examiner* — Ryan Jager

(57) ABSTRACT

A direct digital synthesizer (DDS) includes a phase increment calculator that determines a phase increment for a selected frequency; a phase accumulator that accumulates the phase increment over time and provides an accumulated phase value; a converter that converts the accumulated phase value to an analog signal at the selected frequency; and a phase preset calculator that determines a phase preset value for the selected frequency. The phase accumulator resets the accumulated phase value to the phase preset value at a transition to the selected frequency in a phase coherent mode.

19 Claims, 3 Drawing Sheets

METHOD AND APPARATUS FOR SYNTHESIZING SIGNALS WITH PHASE CONTINUOUS AND PHASE COHERENT TRANSITIONS

BACKGROUND

Direct digital synthesizers (DDS) can generally be characterized as having either phase continuous switching behavior or phase coherent switching behavior. With phase continuous switching behavior, there are no large phase discontinuities when the synthesized analog signal output from the DDS is switched between different frequencies. Phase continuous switching is the usual DDS switching behavior during a frequency change. Phase coherent switching, which is also known as phase repeatable switching, applies a correction to the phase accumulator in the DDS at each frequency change, so that when the synthesized analog signal output from the DDS is switched back to a given frequency, the phase of the synthesized analog signal will be the same as if the synthesized analog signal had never been switched from the given frequency. Phase coherent switching may be used to simulate numerous independent synthesizers each outputting an analog signal at respective different frequencies.

However, to correct and appropriately place the phase of the synthesized analog signal, phase coherent switching typically requires a phase delta to be calculated based on the current state of the DDS every time the frequency of the synthesized analog signal is switched. A phase delta may be calculated and added to the current accumulator value of the DDS based on the previous frequency and the new frequency of the synthesized analog signal. The current accumulator state can thus be said to have a memory of all transitions that have occurred since the last time the DDS was at a given frequency. If the current accumulated phase value of the DDS is not corrected at each transition of the synthesized analog signal to a new frequency, the memory of how to return the synthesized analog signal to a previous frequency will be lost. Such a typical implementation does not allow DDS operation intermixed between phase coherent switching and phase continuous switching.

There is therefore a need to provide a DDS selectively operable and switchable in a phase coherent mode and a phase continuous mode.

SUMMARY

In a representative embodiment, a direct digital synthesizer (DDS) includes a phase increment calculator configured to determine a phase increment for a selected frequency; a phase accumulator configured to accumulate the phase increment over time and provide an accumulated phase value; a converter configured to convert the accumulated phase value to an analog signal having the selected frequency; and a phase preset calculator configured to determine a phase preset value for the selected frequency, the phase accumulator further configured to preset the accumulated phase value to the phase preset value at a transition to the selected frequency in a phase coherent mode.

In another representative embodiment, a method of digitally synthesizing an analog signal includes determining a phase increment for a selected frequency; accumulating the phase increment over time in a phase accumulator to provide an accumulated phase value; converting the accumulated phase value to an analog signal having the selected frequency; determining a phase preset value for the selected frequency; and presetting the accumulated phase value of the phase accumulator to the phase preset value at a transition to the selected frequency in a phase coherent mode.

In a still further representative embodiment, a non-transitory computer readable medium that stores a program executable by a computer for digitally synthesizing an analog signal, the non-transitory computer readable medium includes a phase increment code segment for determining a phase increment for a selected frequency; a phase accumulation code segment for accumulating the phase increment over time and providing an accumulated phase value; a conversion code segment for converting the accumulated phase value to an amplitude value representing a signal having the selected frequency; a phase preset code segment for determining a phase preset value for the selected frequency; and an accumulation preset code segment for presetting the accumulated phase value to the phase preset value at a transition to the selected frequency in a phase coherent mode.

BRIEF DESCRIPTION OF THE DRAWINGS

The illustrative embodiments are best understood from the following detailed description when read with the accompanying drawing figures. Wherever applicable and practical, like reference numerals refer to like elements.

DETAILED DESCRIPTION

In the following detailed description, for purposes of explanation and not limitation, representative embodiments disclosing specific details are set forth in order to provide a thorough understanding of the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatuses and methods may be omitted so as to not obscure the description of the representative embodiments. Such methods and apparatuses are clearly within the scope of the present teachings.

Generally, it should also be understood that as used in the specification and appended claims, the terms "a", "an" and "the" include both singular and plural referents, unless the context clearly dictates otherwise. Thus, for example, "a device" includes one device and plural devices.

As used in the specification and appended claims, and in addition to their ordinary meanings, the terms "substantial" or "substantially" mean to within acceptable limits or degree. For example, "substantially cancelled" means that one skilled in the art would consider the cancellation to be acceptable. As a further example, "substantially removed" means that one skilled in the art would consider the removal to be acceptable.

As used in the specification and the appended claims and in addition to its ordinary meaning, the term "approximately" means to within an acceptable limit or amount to one having ordinary skill in the art. For example, "approximately the same" means that one of ordinary skill in the art would consider the items being compared to be the same.

Figure 1:
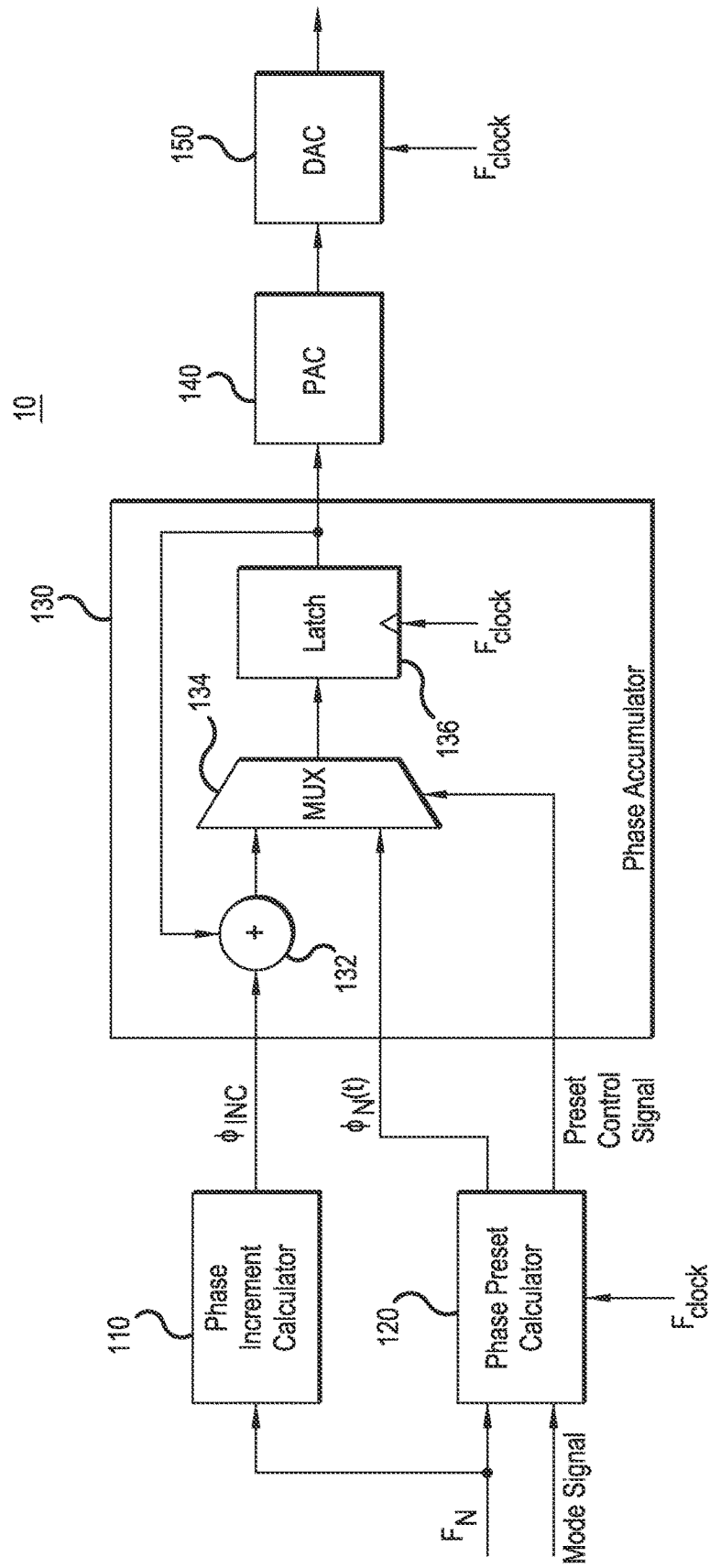
FIG. 1 is a block diagram illustrating a direct digital synthesizer (DDS), according to a representative embodiment.

FIG. 1 is a block diagram illustrating a direct digital synthesizer (DDS) 10, according to a representative embodiment.

Referring to FIG. 1, in a representative embodiment, DDS 10 includes a phase increment calculator 110, a phase preset calculator 120, a phase accumulator 130, a phase to amplitude converter (PAC) 140 and a digital to analog converter (DAC) 150. In a representative embodiment, phase accumulator 130 may include adder 132, multiplexer (MUX) 134 and latch 136. DDS 10 is operable to synthesize an analog signal at a selected frequency in a phase continuous mode and a phase coherent mode.

As shown in FIG. 1, a signal $F_N$ indicative of a selected frequency $F_N$ is input to phase increment calculator 110 and phase preset calculator 120 to set a desired frequency of the analog signal output from DAC 150 of DDS 10. A mode signal which selectively sets operation of DDS 10 in either of a phase continuous mode and a phase coherent mode is also shown as input to phase preset calculator 120. DDS 10 is clocked by system clock $F_{clock}$. System clock $F_{clock}$ is input to latch 136, phase preset calculator 120, and DAC 150 to control timing of DDS 10. The signal $F_N$ indicative of the selected frequency $F_N$ and the mode signal may be input by a system user or a host device (not shown) to control operation of DDS 10. System clock $F_{clock}$ may also be provided by a host device (not shown).

Phase increment calculator 110 as shown in FIG. 1 is connected to receive the signal $F_N$ indicative of the selected frequency $F_N$, and is configured to determine a phase increment $\phi_{INC}$ for the selected frequency $F_N$. The phase increment $\phi_{INC}$ may be determined as $$\phi_{INC}=2\pi(F_N/F_{clock}) \text{radians} \tag{1},$$

wherein $F_N$ is the selected frequency and $F_{clock}$ is the system clock. In this representative embodiment, the phase increment $\phi_{INC}$ is given in units of radians. In other representative embodiments, the phase increment $\phi_{INC}$ may be given in different units such as a fraction of a cycle. Phase increment calculator 110 may be hardware implemented including multipliers and/or other components configured to generate phase increment $\phi_{INC}$ responsive to the selected frequency $F_N$ and the system clock $F_{clock}$. In other representative embodiments, phase increment calculator 110 may be a microprocessor, an application specific integrated circuit (ASIC) or any type of computer processing device or circuitry capable of being programmed to provide phase increment $\phi_{INC}$ responsive to the selected frequency $F_N$ and the system clock $F_{clock}$. Phase increment calculator 110 is configured to determine and continuously output a phase increment $\phi_{INC}$ for a corresponding selected frequency $F_N$ as long as the corresponding selected frequency $F_N$ input to the phase increment calculator 110 does not change. When the selected frequency $F_N$ input to phase increment calculator 110 is changed to a different selected frequency $F_N$, a corresponding phase increment $\phi_{INC}$ is determined and output for the different selected frequency $F_N$. The phase increment $\phi_{INC}$ is output to adder 132 of phase accumulator 130.

Phase preset calculator 120 as shown in FIG. 1 is connected to receive the selected frequency $F_N$, and the mode signal which sets operation of DDS 10 in either of the phase continuous mode or the phase coherent mode. Phase preset calculator 120 is configured to determine a phase preset value $\phi_N(t)$ for the selected frequency $F_N$ at the time of a change in frequency $F_N$. The time of the changes in frequency $F_N$ and the time the phase preset value is calculated do not need to be coincident, but must have a consistent time relationship. The phase preset value $\phi_N(t)$ may be determined as $$\phi_N(t) = \frac{F_N}{F_0} * \phi_0(t), \tag{2}$$

wherein $\phi_N(t)$ is the phase preset value, $F_N$ is the selected frequency, $F_0$ is the frequency resolution of DDS 10, $\phi_0(t)$ is a cyclic phase ramp with a rollover rate of frequency $F_0$, and $(F_N/F_0)$ is an integer. The cyclic phase ramp $\phi_0(t)$ at frequency $F_0$ may be given as $$\phi_0(t)=2\pi F_0 t \tag{3}.$$

The cyclic phase ramp $\phi_0(t)$ is a modulo $2\pi$ phase ramp, always having a value between 0 and $2\pi$ radians. Phase preset calculator 120 may be hardware implemented including multipliers and/or other components configured to generate phase preset value $\phi_N(t)$ at any given time responsive to the selected frequency $F_N$ and the frequency resolution $F_0$. Phase preset calculator 120 may thus be characterized as determining respective different phase preset values $\phi_N(t)$ for a plurality of different selectable frequencies. In other representative embodiments, phase preset calculator 120 may be a microprocessor, an application specific integrated circuit (ASIC) or any type of computer processing device or circuitry capable of being programmed to provide phase preset value $\phi_N(t)$ at any given time responsive to the selected frequency $F_N$ and the frequency resolution $F_0$. The phase preset value $\phi_N(t)$ is output to multiplexer 134 of phase accumulator 130. $F_0$ may be characterized as the frequency resolution of the digital synthesis.

Phase preset calculator 120 is further configured to generate the preset control signal responsive to the mode signal and the frequency $F_N$ input by the system user or the host device (not shown) and the system clock $F_{clock}$. In a representative embodiment, phase preset calculator 120 may for example be configured to generate the preset control signal as having a logical high level for the duration of a single clock period of system clock $F_{clock}$ responsive to a transition to a selected frequency $F_N$ from a different selected frequency in a phase coherent mode, and to generate the preset control signal as having a logical low level at all other times. That is, phase preset calculator 120 may be configured to generate the preset control signal as having a logical low level after the duration of the logical high level generated responsive to the transition in the phase coherent mode, and as also having the logical low level during the entirety of operation in a phase continuous mode. The preset control signal (which may be characterized as a switch signal) is output to multiplexer 134 of phase accumulator 130. The preset control signal switches multiplexer 134 to selectively output the phase preset value $\phi_N(t)$ from phase preset calculator 120 for the duration of the single clock period of system clock $F_{clock}$ responsive to the transition to the selected frequency $F_N$ in the phase coherent mode. The preset control signal switches multiplexer 134 to selectively output an added output from adder 132 after the single clock period of system clock $F_{clock}$ in the phase coherent mode, and also during the entirety of operation in a phase continuous mode. Phase preset calculator 120 may be hardware or software implemented to provide the preset control signal.

In other representative embodiments, phase preset calculator 120 may in the alternative be configured to generate the preset control signal as having a logical low level for the duration of a single clock period of system clock $F_{clock}$ responsive to a transition to a selected frequency $F_N$ from a different selected frequency in a phase coherent mode, and to generate the preset control signal as having a logical high level at all other times, as long as multiplexer 134 is switched to selectively output the phase preset value $\phi_N(t)$ for the duration of the single clock period of system clock $F_{clock}$ responsive to the transition in the phase coherent mode and to output the added output from adder 132 otherwise.

Phase accumulator 130 is configured to accumulate the phase increment $\phi_{INC}$ for a selected frequency $F_N$ over time, and to provide an accumulated phase value as an output of latch 136 to PAC 140. Adder 132 is configured to add phase increment $\phi_{INC}$ from phase increment calculator 110 and the accumulated phase value output from latch 136 each clock period of system clock $F_{clock}$, to provide an added output to multiplexer 134. Multiplexer 134 is connected to receive the added output from adder 132 and the phase preset value $\phi_N(t)$ from phase preset calculator 120. Multiplexer 134 is configured responsive to the preset control signal to output the phase preset value $\phi_N(t)$ for the duration of a single clock period of system clock $F_{clock}$ responsive to a transition to the selected frequency $F_N$ in the phase coherent mode, and to output the added output from adder 132 after the single clock period of system clock $F_{clock}$ and during the phase continuous mode. Phase accumulator 130 may be hardware implemented as shown. In other representative embodiments, phase accumulator 130 may be a microprocessor, an application specific integrated circuit (ASIC) or any type of computer processing device or circuitry capable of being programmed to provide an accumulated phase value at each clock period of system clock $F_{clock}$ responsive to the preset control signal, the phase preset value $\phi_N(t)$ and phase increment $\phi_{INC}$.

PAC 140 is configured to convert the accumulated phase value from phase accumulator 130 into an amplitude value of a periodic function. PAC 140 may convert an accumulated phase value into amplitude values over more than one cycle of a periodic function as long as the duration is a whole integer number of cycles. In a representative embodiment, PAC 140 may implement a sine function with the phase value interpreted as a value between 0 and $2\pi$. PAC 140 may be a look-up table or other algorithmic approach that converts a phase value into an amplitude value. DAC 150 is configured to convert the amplitude value from PAC 140 into an analog signal at each clock period of system clock $F_{clock}$. The analog signal as output from DAC 150 may be characterized as a synthesized analog signal output from DDS 10.

In greater detail, DDS 10 as described with respect to FIG. 1 enables generation of selectable phase continuous and phase coherent frequency changes, on an event by event basis, responsive to input selectable frequency $F_N$ and the mode signal, where each event is a frequency change. In a representative embodiment, cyclic phase ramp $\phi_0(t)$ at frequency $F_0$ is used as a reference of the absolute time for phase calculations. At each transition, phase preset calculator 120 uses equation (2) to directly calculate the phase preset value $\phi_N(t)$ of a selected frequency $F_N$ from cyclic phase ramp $\phi_0(t)$. As described, cyclic phase ramp $\phi_0(t)$ may be determined by equation (3).

Responsive to a transition to a selected frequency $F_N$ during a phase continuous mode of operation of DDS 10, phase increment calculator 110 calculates and outputs the phase increment $\phi_{INC}$ for the selected frequency $F_N$. The phase increment $\phi_{INC}$ is added to the accumulated phase value output from latch 136 by adder 132. In the phase continuous mode, multiplexer 134 is switched to provide the added output of adder 132 to latch 136 responsive to the preset control signal. Latch 136 latches the multiplexed output from multiplexer 134 and provides the latched output to PAC 140.

Figure 2:
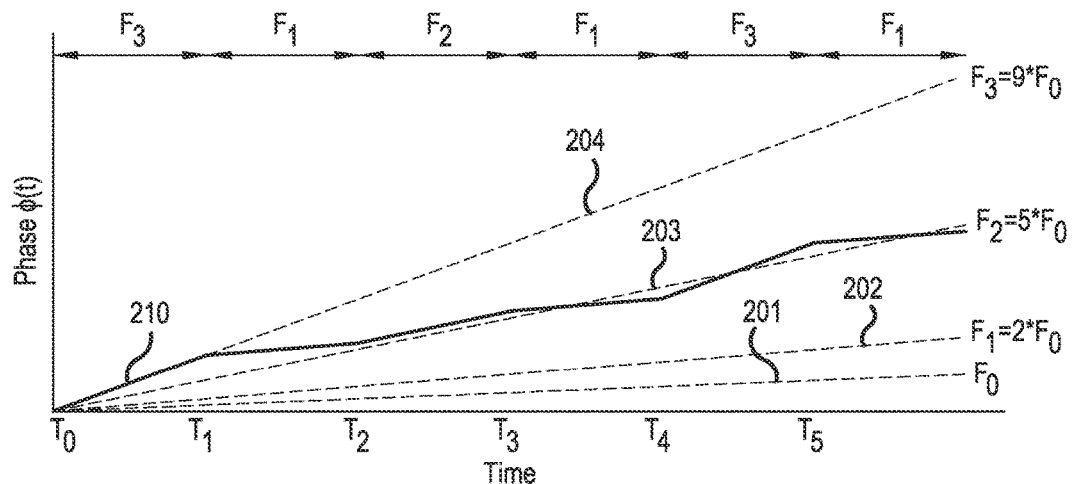
FIG. 2 is a graph illustrating operation of the direct digital synthesizer (DDS) in a phase continuous mode, according to a representative embodiment.

FIG. 2 is a graph illustrating operation of DDS 10 in a phase continuous mode, according to a representative embodiment. FIG. 2 may also be characterized as illustrating operation of a DDS without the ability to switch coherently. Operation of DDS 10 in the phase continuous mode will be described.

Referring to FIG. 2, the vertical axis represents the accumulated phase value output from phase accumulator 130 and the horizontal axis represents time. At time $T_0$ a signal $F_N$ indicating frequency $F_3$ as the selected frequency $F_N$ is input to the phase increment calculator 110 and phase preset calculator 120. The phase increment $\phi_{INC}$ for frequency $F_3$ as the selected frequency $F_N$ is determined and output by phase increment calculator 110. Adder 132 of phase accumulator 130 is configured to add the phase increment $\phi_{INC}$ to the previous phase accumulated value output from latch 136. At time $T_0$, the phase accumulator may be preset to some desired standard value. The absolute phase value at time $T_0$ is not important to the function of the system, since all operations are relative to the phase at time $T_0$. As time progresses from time $T_0$, adder 132 continuously adds the phase increment $\phi_{INC}$ to the previous phase accumulated value output from latch 136 at each clock period of system clock $F_{clock}$. Phase accumulator 130 thus continuously provides an accumulated phase value for selected frequency $F_3$ represented by solid line 210 beginning at time $T_0$ shown in FIG. 2. The accumulated phase value is output to PAC 140, and an analog signal at frequency $F_3$ is subsequently output from DAC 150 responsive to the accumulated phase value. The frequency of the analog signal is defined by the rollover rate of phase accumulator 130, which is set by the phase increment $\phi_{INC}$ calculated with equation (1) from input frequency $F_N$. The dotted lines denoted by reference numeral 202, 203, and 204 may be characterized as reference phase ramps for frequencies $F_1$, $F_2$, and $F_3$. As further shown in FIG. 2, in this representative embodiment selected frequencies $F_1$, $F_2$, and $F_3$ are equal to $(2 \times F_0)$, $(5 \times F_0)$, and $(9 \times F_0)$ respectively, where for the selected frequency $F_N$ the value $(F_N/F_0)$ is an integer (i.e., 2, 5, and 9 respectively). Also in FIG. 2, cyclic phase ramp $\phi_0(t)$ for frequency $F_0$ is shown as a dotted line denoted by reference numeral 201.

At time $T_1$ a signal $F_N$ indicating frequency $F_1$ as the selected frequency $F_N$ is input to phase increment calculator 110 and phase preset calculator 120, and the mode signal input to phase preset calculator 120 is set as indicative of the phase continuous mode. The phase increment $\phi_{INC}$ for frequency $F_1$ as the selected frequency $F_N$ is determined and output by phase increment calculator 110. Adder 132 of phase accumulator 130 adds the phase increment $\phi_{INC}$ to the previous phase accumulated value output from latch 136. Phase accumulator 130 thus continuously provides an accumulated phase value for selected frequency $F_1$ beginning at time $T_1$ shown in FIG. 2. The accumulated phase value is output to PAC 140, and an analog signal at frequency $F_1$ is subsequently output from DAC 150 responsive to the accumulated phase value. The phase of the analog signal output at selected frequency $F_1$ from time $T_1$ thus continues to advance as indicated by the solid line 210 at a constant slope in parallel with the slope of the dotted line denoted by reference numeral 202, indicating that the frequencies of the analog signal output and the reference phase ramp 202 are the same but offset in phase.

Thereafter at time $T_2$ a signal $F_N$ indicating frequency $F_2$ as the selected frequency $F_N$ is input to phase increment calculator 110 and phase preset calculator 120, and the mode signal input to phase preset calculator 120 is maintained as indicative of the phase continuous mode. The phase increment $\phi_{INC}$ for frequency $F_2$ as the selected frequency $F_N$ is determined and output by phase increment calculator 110. Adder 132 of phase accumulator 130 adds the phase increment $\phi_{INC}$ to the previous phase accumulated value output from latch 136. Phase accumulator 130 thus continuously provides an accumulated phase value for selected frequency $F_2$ beginning at time $T_2$ shown in FIG. 2. The accumulated phase value is output to PAC 140, and an analog signal at frequency $F_2$ is subsequently output from DAC 150 responsive to the accumulated phase value. The phase of the analog signal output at selected frequency $F_2$ from time $T_2$ thus continues to advance as indicated by the solid line 210 at a constant slope in parallel with the slope of the dotted line denoted by reference numeral 203, indicating that the frequencies of the analog signal output and the reference phase ramp 203 are the same but offset in phase.

In a similar manner, at time $T_3$ an analog signal at frequency $F_1$ is output from DAC 150 of DDS 10, at time $T_4$ an analog signal at frequency $F_3$ is output from DAC 150 of DDS 10, and at time $T_5$ an analog signal at frequency $F_1$ is output from DAC 150 of DDS 10, responsive to the signal $F_N$ indicating the selected frequency and the mode signal indicating phase continuous mode. As may be understood in view of FIG. 2, the phase of the analog signal synthesized by DDS 10 is continuous during frequency transitions at times $T_1$-$T_5$. There are no discontinuities in the phase of the output from DDS 10.

Figure 3:
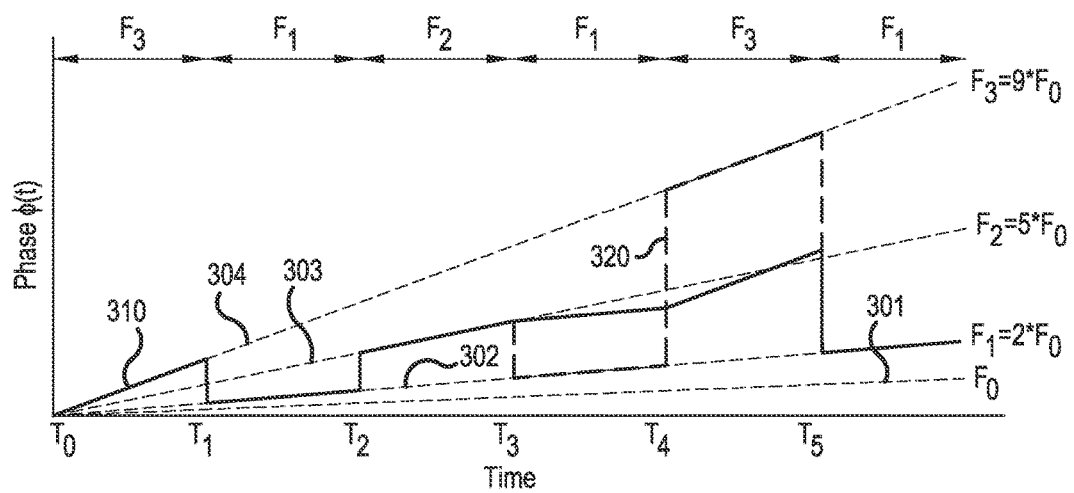
FIG. 3 is a graph illustrating operation of the direct digital synthesizer (DDS) as selectively switchable between a phase continuous mode and a phase coherent mode, according to a representative embodiment.

FIG. 3 is a graph illustrating operation of DDS 10 as selectively switchable between a phase continuous mode and a phase coherent mode, according to a representative embodiment.

Referring to FIG. 3, the vertical axis represents the accumulated phase value output from phase accumulator 130 and the horizontal axis represents time. At times $T_0$, $T_1$, $T_2$, $T_3$, $T_4$ and $T_5$ respective signals $F_N$ indicating frequency $F_3$, $F_1$, $F_2$, $F_1$, $F_3$ and $F_1$ as the selected frequency $F_N$ are input to phase increment calculator 110 and phase preset calculator 120. Moreover, as shown by the solid line 310, a mode signal at time $T_0$ indicative of phase coherent mode, a mode signal at time $T_1$ indicative of phase coherent mode, a mode signal at time $T_3$ indicative of phase continuous mode, a mode signal at time $T_4$ indicative of phase continuous mode and a mode signal at time $T_5$ indicative of phase coherent mode are respectively input to phase preset calculator 120 at the transitions. The dotted lines denoted by reference numerals 302, 303, and 304 may be characterized as reference phase ramps for frequencies $F_1$, $F_2$, and $F_3$. As further shown in FIG. 3, in this representative embodiment selected frequencies $F_1$, $F_2$, and $F_3$ are equal to $(2 \times F_0)$, $(5 \times F_0)$, and $(9 \times F_0)$ respectively, where for the selected frequency $F_N$ the value $(F_N/F_0)$ is an integer (i.e., 2, 5, and 9 respectively). Also in FIG. 3, cyclic phase ramp $\phi_0(t)$ for frequency $F_0$ is shown as a dotted line denoted by reference numeral 301.

Similarly as described above with respect to FIG. 2, in FIG. 3, at time $T_0$, phase increment $\phi_{INC}$ for frequency $F_3$ as the selected frequency $F_N$ is determined and output by phase increment calculator 110. Adder 132 continuously adds the phase increment $\phi_{INC}$ to the previous phase accumulated value output from latch 136 at each clock period of system clock $F_{clock}$. Phase accumulator 130 thus continuously provides an accumulated phase value for selected frequency $F_3$ beginning at time $T_0$ shown in FIG. 3. The accumulated phase value is output to PAC 140, and an analog signal at frequency $F_3$ is subsequently output from DAC 150 responsive to the accumulated phase value.

At time $T_1$ a signal $F_N$ indicating frequency $F_1$ as the selected frequency $F_N$ is input to phase increment calculator 110 and phase preset calculator 120, and the mode signal input to phase preset calculator 120 is indicative of the phase coherent mode. Responsive to the phase coherent mode at time $T_1$, phase preset calculator 120 uses equation (2) to directly determine and then output the phase preset value $\phi_1(t)$ of selected frequency $F_1$ as the phase preset value $\phi_N(t)$. As the selected frequency $F_N$ transitions to frequency $F_1$ at time $T_1$, multiplexer 134 is switched by the preset control signal to provide phase preset value $\phi_1(t)$ of selected frequency $F_1$ as the phase preset value $\phi_N(t)$ to latch 136. The accumulated phase value of phase accumulator 130 is thus preset at time $T_1$ to an absolute phase value that would have accumulated at time $T_1$ if the analog signal was output from DDS 10 at frequency $F_1$ continuously from time $T_0$ (a previous time). Thereafter, in absence of any further frequency transition in the phase coherent mode, multiplexer 134 is switched by the preset control signal to provide the added output from adder 132 to latch 136 for each clock period of system clock $F_{clock}$ after the single clock period of system clock $F_{clock}$ following the transition at time $T_1$. That is, adder 132 thereafter adds the phase increment $\phi_{INC}$ to the phase preset value $\phi_1(t)$ initially output from latch 136 so that accumulation based on the phase increment $\phi_{INC}$ for frequency $F_1$ starts at the phase preset value $\phi_1(t)$. The phase of the analog signal output DDS 10 at selected frequency $F_1$ from time $T_1$ thus continues to advance as indicated by the solid line 310 at a constant slope coinciding with the slope of the dotted line denoted by reference numeral 302, indicating the analog output is phase coherent with the reference phase ramp denoted by reference numeral 302.

At time $T_2$ a signal $F_N$ indicating frequency $F_2$ as the selected frequency $F_N$ is input to phase increment calculator 110 and phase preset calculator 120, and the mode signal input to phase preset calculator 120 is indicative of the phase coherent mode. Responsive to the phase coherent mode at time $T_2$, phase preset calculator 120 uses equation (2) to directly determine and then output the phase preset value $\phi_2(t)$ of selected frequency $F_2$ as the phase preset value $\phi_N(t)$. As the selected frequency $F_N$ transitions to frequency $F_2$ at time $T_2$, multiplexer 134 is switched by the preset control signal to provide phase preset value $\phi_2(t)$ of selected frequency $F_2$ as the phase preset value $\phi_N(t)$ to latch 136. The accumulated phase value of phase accumulator 130 is thus preset at time $T_2$ to an absolute phase value that would have accumulated at time $T_2$ if the analog signal was output from DDS 10 at frequency $F_2$ continuously from time $T_0$. Thereafter, in absence of any further frequency transition in the phase coherent mode, multiplexer 134 is switched by the preset control signal to provide the added output from adder 132 to latch 136 for each clock period of system clock $F_{clock}$ after the single clock period of system clock $F_{clock}$ following the transition at time $T_2$. That is, adder 132 thereafter adds the phase increment $\phi_{INC}$ to the phase preset value $\phi_2(t)$ initially output from latch 136 so that accumulation based on the phase increment $\phi_{INC}$ for frequency $F_2$ starts at the phase preset value $\phi_2(t)$. The phase of the analog signal output DDS 10 at selected frequency $F_2$ from time $T_2$ thus continues to advance as indicated by the solid line at a constant slope coinciding with the slope of the dotted line denoted by reference numeral 303, indicating the analog output is phase coherent with the reference phase ramp denoted by reference numeral 303.

At time $T_3$ a signal $F_N$ indicating frequency $F_1$ as the selected frequency $F_N$ is input to phase increment calculator 110 and phase preset calculator 120, and the mode signal input to phase preset calculator 120 is indicative of the phase continuous mode. The phase increment $\phi_{INC}$ for frequency $F_1$ as the selected frequency $F_N$ is determined and output by phase increment calculator 110. Adder 132 of phase accumulator 130 is configured to add the phase increment $\phi_{INC}$ to the previous phase accumulated value output from latch 136 immediately prior to time $T_3$. In the phase continuous mode, multiplexer 134 is switched by the preset control signal to provide the added output from adder 132 to latch 136. As time progresses from time $T_3$, adder 132 continuously adds the phase increment $\phi_{INC}$ for frequency $F_1$ to the previous phase accumulated value output from latch 136 at each clock period of system clock $F_{clock}$. Phase accumulator 130 thus continuously provides an accumulated phase value for selected frequency $F_1$ beginning at time $T_3$ shown in FIG. 3. The accumulated phase value is output to PAC 140, and an analog signal at frequency $F_1$ is subsequently output from DAC 150 responsive to the accumulated phase value, without a phase discontinuity at the transition from previous frequency $F_2$ to frequency $F_1$. The phase of the analog signal output at selected frequency $F_1$ from time $T_3$ thus continues to advance as indicated by the solid line 310 at a constant slope in parallel with the slope of the dotted line denoted by reference numeral 302, indicating that the frequencies of the analog signal output and the reference phase ramp 302 are the same but offset in phase.

At time $T_4$ a signal $F_N$ indicating frequency $F_3$ as the selected frequency $F_N$ is input to phase increment calculator 110 and phase preset calculator 120, and the mode signal input to phase preset calculator 120 is indicative of the phase continuous mode. The phase increment $\phi_{INC}$ for frequency $F_3$ as the selected frequency $F_N$ is determined and output by phase increment calculator 110. Adder 132 of phase accumulator 130 is configured to add the phase increment $\phi_{INC}$ to the previous phase accumulated value output from latch 136 immediately prior to time $T_4$. In the phase continuous mode, multiplexer 134 is switched by the preset control signal to provide the added output from adder 132 to latch 136. As time progresses from time $T_4$, adder 132 continuously adds the phase increment $\phi_{INC}$ for frequency $F_3$ to the previous phase accumulated value output from latch 136 at each clock period of system clock $F_{clock}$. Phase accumulator 130 thus continuously provides an accumulated phase value for selected frequency $F_3$ beginning at time $T_4$ shown in FIG. 3. The accumulated phase value is output to PAC 140, and an analog signal at frequency $F_3$ is subsequently output from DAC 150 responsive to the accumulated phase value, without phase discontinuity at the transition from previous frequency $F_1$ to frequency $F_3$. The phase of the analog signal output at selected frequency $F_3$ from time $T_4$ thus continues to advance as indicated by the solid line 310 at a constant slope in parallel with the slope of the dotted line denoted by reference numeral 304, indicating that the frequencies of the analog signal output and the reference phase ramp 304 are the same but offset in phase.

At time $T_5$ a signal $F_N$ indicating frequency $F_1$ as the selected frequency $F_N$ is input to phase increment calculator 110 and phase preset calculator 120, and the mode signal input to phase preset calculator 120 is indicative of the phase coherent mode. Responsive to the phase coherent mode at time $T_5$, phase preset calculator 120 uses equation (2) to directly determine and then output the phase preset value $\phi_1(t)$ of selected frequency $F_1$ as the phase preset value $\phi_N(t)$. As the selected frequency $F_N$ transitions to frequency $F_1$ at time $T_5$, multiplexer 134 is switched by the preset control signal to provide phase preset value $\phi_1(t)$ of selected frequency $F_1$ as the phase preset value $\phi_N(t)$ to latch 136. The accumulated phase value of phase accumulator 130 is thus preset at time $T_5$ to an absolute phase value that would have accumulated at time $T_5$ if the analog signal was output from DDS 10 at frequency $F_1$ continuously from time $T_0$. Thereafter, in absence of any further frequency transition in the phase coherent mode, multiplexer 134 is switched by the preset control signal to provide the added output from adder 132 to latch 136 for each clock period of system clock $F_{clock}$ after the single clock period of system clock $F_{clock}$ following the transition at time $T_5$. That is, adder 132 thereafter adds the phase increment $\phi_{INC}$ to the phase preset value $\phi_1(t)$ initially output from latch 136 so that accumulation based on the phase increment $\phi_{INC}$ for frequency $F_1$ starts at the phase preset value $\phi_1(t)$. The phase of the analog signal output DDS 10 at selected frequency $F_1$ from time $T_5$ thus continues to advance as indicated by the solid line at a constant slope coinciding with the slope of the dotted line denoted by reference numeral 301 indicating the analog output is phase coherent with the reference phase ramp denoted by reference numeral 301.

With further reference to FIG. 3, a representative embodiment is described wherein DDS 10 is operated in the phase coherent mode at each of times $T_0$, $T_1$, $T_2$, $T_3$, $T_4$ and $T_5$. Solid line 310 as used in the following description is indicative of accumulated phase values output from phase accumulator 130 shown in FIG. 1 during phase coherent mode from time $T_0$ to $T_3$. Dashed line 320 is indicative of accumulated phase values output from phase accumulator 130 during phase coherent mode from time $T_3$ to $T_5$. That is, in this description dashed line 320 replaces solid line 310 between times $T_3$ through time $T_5$.

The operation of DDS 10 at times $T_0$, $T_1$, $T_2$ and $T_5$ in the phase coherent mode is the same as previously described with respect to FIG. 3, and similar description will therefore be omitted.

At time $T_3$ as indicated by dashed line 320 in FIG. 3, signal $F_N$ indicating frequency $F_1$ as the selected frequency $F_N$ is input to phase increment calculator 110 and phase preset calculator 120, and the mode signal input to phase preset calculator 120 is indicative of the phase coherent mode. Responsive to the phase coherent mode at time $T_3$, phase preset calculator 120 uses equation (2) to directly determine and then output the phase preset value $\phi_1(t)$ of selected frequency $F_1$ as the phase preset value $\phi_N(t)$. As the selected frequency $F_N$ transitions to frequency $F_1$ at time $T_3$, multiplexer 134 is switched by the preset control signal to provide phase preset value $\phi_1(t)$ of selected frequency $F_1$ as the phase preset value $\phi_N(t)$ to latch 136. The accumulated phase value of phase accumulator 130 is thus preset at time $T_3$ to an absolute phase value that would have accumulated at time $T_3$ if the analog signal was output from DDS 10 at frequency $F_1$ continuously from time $T_0$. Thereafter, in absence of any further frequency transition in the phase coherent mode, multiplexer 134 is switched by the preset control signal to provide the added output from adder 132 to latch 136 for each clock period of system clock $F_{clock}$ after the single clock period of system clock $F_{clock}$ following the transition at time $T_3$. That is, adder 132 thereafter adds the phase increment $\phi_{INC}$ to the phase preset value $\phi_1(t)$ initially output from latch 136 so that accumulation based on the phase increment $\phi_{INC}$ for frequency $F_1$ starts at the phase preset value $\phi_1(t)$. The phase of the analog signal output DDS 10 at selected frequency $F_1$ from time $T_3$ thus continues to advance as indicated by the dashed line 320 at a constant slope coinciding with the slope of the dotted line denoted by reference numeral 301 indicating the analog output is phase coherent with the reference phase ramp denoted by reference numeral 301.

At time $T_4$ as indicated by dashed line 320 in FIG. 3, a signal $F_N$ indicating frequency $F_3$ as the selected frequency $F_N$ is input to phase increment calculator 110 and phase preset calculator 120, and the mode signal input to phase preset calculator 120 is indicative of the phase coherent mode. Responsive to the phase coherent mode at time $T_4$, phase preset calculator 120 uses equation (2) to directly determine and then output the phase preset value $\phi_3(t)$ of selected frequency $F_3$ as the phase preset value $\phi_N(t)$. As the selected frequency $F_N$ transitions to frequency $F_3$ at time $T_4$, multiplexer 134 is switched by the preset control signal to provide phase preset value $\phi_3(t)$ of selected frequency $F_3$ as the phase preset value $\phi_N(t)$ to latch 136. The accumulated phase value of phase accumulator 130 is thus preset at time $T_4$ to an absolute phase value that would have accumulated at time $T_4$ if the analog signal was output from DDS 10 at frequency $F_3$ continuously from time $T_0$. Thereafter, in absence of any further frequency transition in the phase coherent mode, multiplexer 134 is switched by the preset control signal to provide the added output from adder 132 to latch 136 for each clock period of system clock $F_{clock}$ after the single clock period of system clock $F_{clock}$ following the transition at time $T_4$. That is, adder 132 thereafter adds the phase increment $\phi_{INC}$ to the phase preset value $\phi_3(t)$ initially output from latch 136 so that accumulation based on the phase increment $\phi_{INC}$ for frequency $F_3$ starts at the phase preset value $\phi_3(t)$. The phase of the analog signal output DDS 10 at selected frequency $F_3$ from time $T_4$ thus continues to advance as indicated by the dashed line 320 at a constant slope coinciding with the slope of the dotted line denoted by reference numeral 304 indicating the analog output is phase coherent with the reference phase ramp denoted by reference numeral 301.

Figure 4:
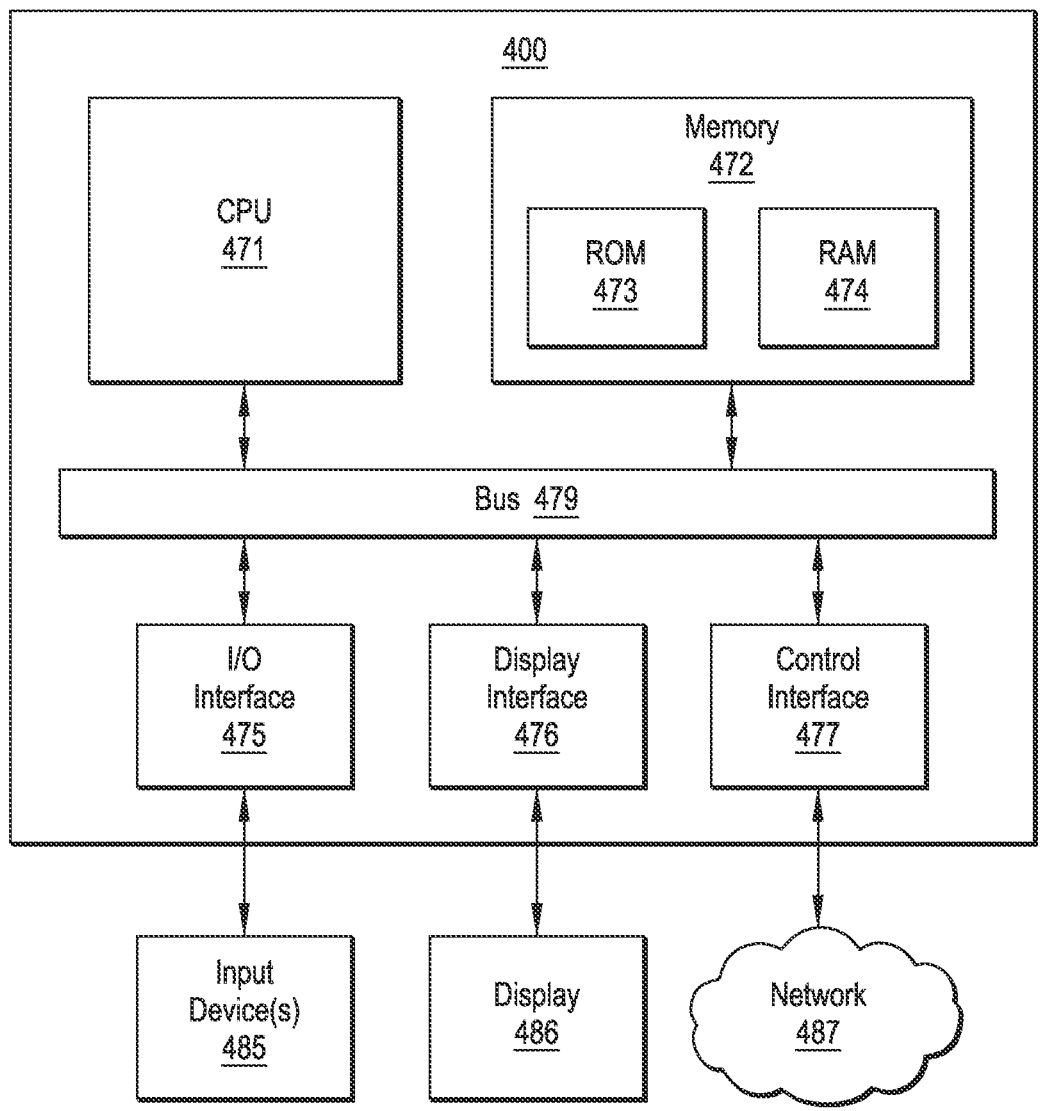
FIG. 4 is a functional block diagram illustrating a computer system for executing an algorithm to control processing operations of the direct digital synthesizer (DDS) shown in FIG. 1, according to a representative embodiment.

FIG. 4 is a functional block diagram illustrating a computer system 400, for executing an algorithm to control operations of DDS 10 of FIG. 1, according to a representative embodiment. The computer system 400 may be any type of computer processing device, such as a PC, capable of executing the various steps of the programming language translation process. In other representative embodiments, the computer system 400 may be included in DDS 10.

In the depicted representative embodiment, the computer system 400 includes central processing unit (CPU) 471, memory 472, bus 479 and interfaces 475-477. Memory 472 includes at least nonvolatile read only memory (ROM) 473 and volatile random access memory (RAM) 474, although it is understood that memory 472 may be implemented as any number, type and combination of ROM and RAM and of internal and external memory. Memory 472 may provide look-up tables and/or other relational functionality. In various embodiments, the memory 472 may include any number, type and combination of tangible computer readable storage media, such as a disk drive, compact disc (e.g., CD-R/CD/RW), electrically programmable read-only memory (EPROM), electrically erasable and programmable read only memory (EEPROM), digital video disc (DVD), universal serial bus (USB) drive, diskette, floppy disk, and the like. Further, the memory 472 may store program instructions and results of calculations performed by CPU 471.

The CPU 471 is configured to execute one or more software algorithms, including control of DDS 10 according to various embodiments described herein, e.g., in conjunction with memory 472. The CPU 471 may include its own memory (e.g., nonvolatile memory) for storing executable software code that allows it to perform the various functions. Alternatively, the executable code may be stored in designated memory locations within memory 472. The CPU 471 may execute any of various known operating systems.

In a representative embodiment, a user and/or other computers may interact with the computer system 400 using input device(s) 485 through I/O interface 475. The input device(s) 485 may include any type of input device, for example, a keyboard, a track ball, a mouse, a touch pad or touch-sensitive display, and the like. Also, information may be displayed by the computer system 400 on display 486 through display interface 476, which may include any type of graphical user interface (GUI), for example.

The computer system 400 may also include a control interface 477 for communicating with various components of DDS 10. For example, in various representative embodiments, the computer system 400 is able to communicate with phase preset calculator 120 to provide selected frequency $F_N$ and the mode signal, and with phase increment calculator 110 to provide selected frequency $F_N$, via a wired or wireless LAN, for example, indicated by network 487. Computer system 400 may also communicate with DDS 10 to provide system clock $F_{clock}$ to the various components shown in FIG. 1. The control interface 477 may include, for example, a transceiver (not shown), including a receiver and a transmitter, that communicates wirelessly over a data network through an antenna system (not shown), according to appropriate standard protocols. However, it is understood that the control interface 477 may include any type of interface, without departing from the scope of the present teachings.

The various "parts" shown in DDS 10 may be physically implemented using a software-controlled microprocessor, hard-wired logic circuits, or a combination thereof. In a representative embodiment, computer system 400 may carry out the functionality of phase increment calculator 110, phase preset calculator 120, phase accumulator 130 and PAC 140. Computer system 400 may be configured to carry out all or part of the functionality of DDS 10 using program instructions which may be stored as code segments in any number, type and combination of the above noted tangible computer readable storage media or non-transitory computer readable medium. For example, the non-transitory computer readable medium may include a phase increment code segment for determining a phase increment for a selected frequency, a phase accumulation code segment for accumulating the phase increment over time and providing an accumulated phase value, a conversion code segment for converting the accumulated phase value to an amplitude value representing a signal having the selected frequency, a phase preset code segment for determining a phase preset value for the selected frequency, and an accumulation preset code segment for presetting the accumulated phase value to the phase preset value at a transition to the selected frequency in a phase coherent mode. The non-transitory computer readable medium may further include among others an adder code segment, a multiplexer code segment, a latch code segment and an amplitude code segment. DDS 10 may thus be virtually implemented.

The various "parts" shown in the computer system 400 may be physically implemented using a software-controlled microprocessor, hard-wired logic circuits, or a combination thereof. Also, while the parts are functionally segregated in the computer system 400 for explanation purposes, they may be combined variously in any physical implementation.

In representative embodiments, other various operations such as frequency or phase modulation may be carried out by DDS 10 while maintaining the capability of phase coherent switching, because operation of DDS 10 is not dependent on a previous state of phase accumulator 130 prior to the transition in the phase coherent mode.

In representative embodiments, DDS 10 as described provides the capability of repeating a precise set of phase transitions from the exact same initial conditions. This can be achieved because of the ability to preset the reference phase ramp of a selected frequency to a known state. This allows any repeatable sequence of events to have a repeatable phase profile by ensuring that the first step in the sequence presets the reference phase of the selected frequency. A benefit of this feature is that multiple systems can be synchronized in such a way that they maintain a precise phase relationship to each other, starting at the point of the time of the specified set of initial conditions.

The phrase "and/or," as used herein in the specification and in the claims, should be understood to mean "either or both" of the elements so conjoined. In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The various components, materials, structures and parameters are included by way of illustration and example only and not in any limiting sense. In view of this disclosure, those skilled in the art can implement the present teachings in determining their own applications and needed components, materials, structures and equipment to implement these applications, while remaining within the scope of the appended claims.

Therefore the invention should not be limited to the particular example embodiments described in detail above.

While example embodiments are disclosed herein, one of ordinary skill in the art appreciates that many variations that are in accordance with the present teachings are possible and remain within the scope of the appended claims. The invention therefore is not to be restricted except within the scope of the appended claims.

What is claimed is:

1. A direct digital synthesizer (DDS) comprising:
   a phase increment calculator configured to determine a phase increment for a selected frequency;
   a phase accumulator configured to accumulate the phase increment over time and provide an accumulated phase value;
   a converter configured to convert the accumulated phase value to an analog signal having the selected frequency; and
   a phase preset calculator configured to determine a phase preset value for the selected frequency and output the phase preset value to the phase accumulator,
   the phase accumulator further configured to output the accumulated phase value in a phase continuous mode and preset the accumulated phase value to the phase preset value at a transition to the selected frequency in a phase coherent mode.

2. The DDS of claim 1, wherein the phase accumulator comprises:
   an adder configured to add the phase increment and the accumulated phase value to provide an added output;
   a multiplexer connected to receive the added output and the phase preset value, and configured to output
      the phase preset value at the transition to the selected frequency in the phase coherent mode, and
      the added output after the transition and during the phase continuous mode; and
   a latch configured to latch the output of the multiplexer and provide the latched output as the accumulated phase value.

3. The DDS of claim 2, wherein the phase preset calculator is further configured to generate a switch signal that switches the multiplexer to selectively output the phase preset value and the added output.

4. The DDS of claim 1, wherein the phase preset calculator is configured to determine the phase preset value as $$\phi_N(t) = \frac{F_N}{F_0} * \phi_0(t),$$

wherein $\phi_N(t)$ is the phase preset value, $F_N$ is the selected frequency, $F_0$ is the frequency resolution of the DDS, $\phi_0(t)$ is a cyclic phase ramp with a rollover rate of frequency $F_0$, and $(F_N/F_0)$ is an integer.

5. The DDS of claim 1, wherein the converter comprises:
   a look-up table or algorithm configured to convert the accumulated phase value into an amplitude; and
   a digital to analog converter configured to convert the amplitude into the analog signal.

6. The DDS of claim 1, wherein the phase preset calculator is configured to determine respective phase preset values for a plurality of different selectable frequencies.

7. The DDS of claim 1, wherein the phase preset value for the selected frequency is an accumulated phase value that would have accumulated at the transition if the analog signal at the selected frequency was output from the DDS continuously from a previous time at the selected frequency.

8. A method of digitally synthesizing an analog signal, the method comprising:
   determining a phase increment for a selected frequency;
   accumulating the phase increment over time in a phase accumulator to provide an accumulated phase value in a phase continuous mode;
   converting the accumulated phase value to an analog signal having the selected frequency;
   determining a phase preset value for the selected frequency; and
   presetting the accumulated phase value of the phase accumulator to the phase preset value at a transition to the selected frequency in a phase coherent mode.

9. The method of claim 8, further comprising:
   adding the phase increment and the accumulated phase value to provide an added output;

multiplexing the added output and the phase preset value to provide the phase preset value at the transition to the selected frequency in the phase coherent mode, and to provide the added output after the transition and during the phase continuous mode; and latching the multiplexed output and providing the latched output as the accumulated phase value.

10. The method of claim 8, wherein the phase preset value is determined as $$\phi_N(t) = \frac{F_N}{F_0} * \phi_0(t),$$

wherein $\phi_N(t)$ is the phase preset value, $F_N$ is the selected frequency, $F_0$ is the frequency resolution of the digital synthesis, $\phi_0(t)$ is a cyclic phase ramp with a rollover rate of frequency $F_0$, and $(F_N/F_0)$ is an integer.

11. The method of claim 8, wherein said converting comprises:
   converting the accumulated phase value into an amplitude using a look-up table or an algorithm; and
   converting the amplitude into the analog signal.

12. The method of claim 8, wherein respective phase preset values are determined for a plurality of different selectable frequencies, and the accumulated phase value of the phase accumulator is selectively preset to the respective phase preset values at transitions to the plurality of different selectable frequencies in the phase coherent mode.

13. The method of claim 8, wherein the phase preset value for the selected frequency is an accumulated phase value that would have accumulated at the transition if the analog signal at the selected frequency was output from the DDS continuously from a previous time at the selected frequency.

14. A non-transitory computer readable medium that stores a program executable by a computer for digitally synthesizing an analog signal, the non-transitory computer readable medium comprising:
   a phase increment code segment for determining a phase increment for a selected frequency;
   a phase accumulation code segment for accumulating the phase increment over time and providing an accumulated phase value in a phase continuous mode;
   a conversion code segment for converting the accumulated phase value to an amplitude value representing a signal having the selected frequency;
   a phase preset code segment for determining a phase preset value for the selected frequency; and
   an accumulation preset code segment for presetting the accumulated phase value to the phase preset value at a transition to the selected frequency in a phase coherent mode.

15. The non-transitory computer readable medium of claim 14, further comprising:
   an adder code segment for adding the phase increment and the accumulated phase value to provide an added output;
   a multiplexer code segment for multiplexing the added output and the phase preset value to provide the phase preset value at the transition to the selected frequency in the phase coherent mode, and to provide the added output after the transition and during the phase continuous mode; and
   a latch code segment for latching the output responsive to the multiplexer code segment and providing the latched output as the accumulated phase value.

16. The non-transitory computer readable medium of claim 14, wherein the phase preset code segment is for determining the phase preset value as $$\phi_N(t) = \frac{F_N}{F_0} * \phi_0(t),$$

wherein $\phi_N(t)$ is the phase preset value, $F_N$ is the selected frequency, $F_0$ is the frequency resolution of the digital synthesis, $\phi_0(t)$ is a cyclic phase ramp with a rollover rate of frequency $F_0$, and $(F_N/F_0)$ is an integer.

17. The non-transitory computer readable medium of claim 14, wherein the conversion code segment comprises:
   an amplitude code segment for converting the accumulated phase value into an amplitude.

18. The non-transitory computer readable medium of claim 14, wherein the phase preset code segment is for determining respective phase preset values for a plurality of different selectable frequencies, and the accumulation preset code segment is for selectively presetting the accumulated phase value to the respective phase preset values at transitions to the plurality of different selectable frequencies in the phase coherent mode.

19. The non-transitory computer readable medium of claim 14, wherein the phase preset value for the selected frequency is an accumulated phase value that would have accumulated at the transition if the analog signal at the selected frequency was output continuously from a previous time at the selected frequency.

\* \* \* \* \*